(12) United States Patent
Fu

(10) Patent No.: US 7,697,104 B2
(45) Date of Patent: Apr. 13, 2010

(54) SEALING STRUCTURE OF LIQUID CRYSTAL PANEL HAVING AN INVERTED T SHAPE AND METHOD FOR MANUFACTURING SAME

(75) Inventor: Jian-Jhong Fu, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 213 days.

(21) Appl. No.: 11/784,945

(22) Filed: Apr. 9, 2007

(65) Prior Publication Data
US 2007/0236643 A1 Oct. 11, 2007

(30) Foreign Application Priority Data
Apr. 7, 2006 (TW) .............. 95112482 A

(51) Int. Cl.
*G02F 1/1339* (2006.01)
(52) U.S. Cl. ........................... 349/153; 349/190
(58) Field of Classification Search .......... 349/153, 349/190, 154
See application file for complete search history.

(56) References Cited
U.S. PATENT DOCUMENTS 6,211,928 B1 * 4/2001 Oh et al. ............... 349/43
6,914,659 B2 7/2005 Tsai et al.
7,130,009 B2 * 10/2006 Saigo et al. ............... 349/141
2001/0013908 A1 * 8/2001 Gu et al. ............... 349/43
2001/0013918 A1 * 8/2001 Kwak et al. ............... 349/153
2006/0139553 A1 * 6/2006 Kang et al. ............... 349/149
2006/0176439 A1 * 8/2006 Tashiro et al. ............... 349/190

* cited by examiner

*Primary Examiner*—Andrew Schechter
*Assistant Examiner*—Dennis Y Kim
(74) *Attorney, Agent, or Firm*—Wei Te Chung

(57) ABSTRACT

An exemplary sealing structure of a liquid crystal panel (2) is provided. The liquid crystal panel includes a pair of substrates (21, 22) and a liquid crystal layer (23) between the substrates. The sealing structure includes: a multi-layer structure (25) having a first layer (222) formed above one of the substrates and a second layer (223) formed above the first layer; an opening structure (226) having a first opening (226a) in the first layer and a second opening (226b) in the second layer and formed at the multi-layer structure. The first opening and the second opening are aligned with each other, the first opening is larger than the second opening, and a sealant (23) is sandwiched between the substrates, including in the opening structure. The adherence of the two substrates is improved.

20 Claims, 3 Drawing Sheets

SEALING STRUCTURE OF LIQUID CRYSTAL PANEL HAVING AN INVERTED T SHAPE AND METHOD FOR MANUFACTURING SAME

CROSS-REFERENCE TO RELATED APPLICATION

This application is related to, and claims the benefit of, a foreign priority application filed in Taiwan as Serial No. 095112482 on Apr. 7, 2006. The related application is incorporated herein by reference.

BACKGROUND OF THE INVENTION

1. Field of the Invention

The present invention relates to a new sealing structure of a liquid crystal panel and a method for manufacturing the sealing structure.

2. General Background

A conventional liquid crystal panel of a liquid crystal display device includes a pair of substrates and a liquid crystal layer between the substrates. A sealant is used to attach the substrates together and seal the liquid crystal layer between the substrates. The liquid crystal layer is located in a main display region between the substrates, and the sealant is located at a peripheral region between the substrates. The sealant acts to not only isolate the liquid crystal layer from the external environment, but also to firmly adhere the substrates together. A peripheral sealing track is defined at either or both of the substrates. Apertures are arranged within the sealing track in order to increase contact surfaces between the substrate and the sealant. Thereby, the strength of adhesion of the substrates is enhanced.

FIG. 4 shows a schematic, exploded, isometric view of a conventional liquid crystal panel. The liquid crystal panel 1 includes a first substrate 1, a second substrate 12, a sealant 13, and a liquid crystal (LC) layer 14. The second substrate 12 is located opposite to the first substrate 11. The sealant 13 is applied between the first substrate 11 and the second substrate 12. The LC layer 14 is filled in an intermediate region cooperatively defined between the first substrate 11, the second substrate 12, and the sealant 13.

Further referring to FIG. 5, this is a cross-sectional view of part of the liquid crystal panel 1 once the liquid crystal panel 1 is assembled, such part corresponding to line V-V of FIG. 4. The first substrate 11 is a color filter substrate, which includes a first base plate 111, and a transparent electrode 114 formed on an inner surface of the first base plate 111. The first base plate 111 can be a glass substrate, and the transparent electrode 114 may be formed of indium tin oxide (ITO). The second substrate 112 is an array substrate, which typically includes a gate insulating layer 122 and a passivation layer 124 formed on an inner surface of a second base plate 121 in that order.

The first substrate 11 and the second substrate 12 are adhered to each other by the sealant 13. Thus the quality of adherence of the liquid crystal panel 1 is dependent on the quality of adherence of the sealant 13 with each of the transparent electrode 114 and the passivation layer 124 directly. A peripheral opening structure 126 is defined through both the gate insulating layer 122 and the passivation layer 124. The opening structure 126 provides a contact area between the sealant 13 and the base plate 121 directly, and increases an overall contact area of the sealant 13. However, even this configuration may still be insufficient to provide satisfactory adherence of the liquid crystal panel 1. Hence, there is a need for an improved sealing structure for manufacturing liquid crystal panels.

SUMMARY

In one aspect, a sealing structure of a liquid crystal panel is provided. The liquid crystal panel has a pair of substrates and a liquid crystal layer disposed between the substrates. The sealing structure includes: a multi-layer structure having a first layer formed above one of the substrates and a second layer formed above the first layer; an opening structure having a first opening in the first layer and a second opening in the second layer and formed at the multi-layer structure; wherein the first opening and the second opening are aligned wit each other, the first opening is larger than the second opening, and a sealant is sandwiched between the substrates, including in the opening structure.

In another aspect, a method of forming a sealing structure of a liquid crystal panel is provided. The method includes: forming a first layer at an inner surface of a substrate; forming a second layer above the first layer; forming a second opening in the second layer, and a first opening in the first layer, wherein the first opening and the second opening are aligned with each other, and a portion of the substrate below the first opening is exposed; and filling sealant in the first opening and the second opening.

Unlike in the prior art, the opening structure of the first layer is larger than that of the second layer. This gives the multi-layer structure a specific cross-sectional profile, such that the part of sealant filled in the first opening and the second opening is fixed by the multi-layer structure. Thus, the improved sealing structure can prevent the sealant separating from the second substrate. Further, the physical adhering force of the sealant resulting from the opening structure efficiently enhances adherence between the first substrate and the second substrate.

BRIEF DESCRIPTION OF THE DRAWINGS

Embodiments of the present invention can be more fully understood by reading the subsequent detailed description and examples with references made to the accompanying drawings, wherein.

DETAILED DESCRIPTION

Hereinafter, preferred and exemplary embodiments of the present invention will be described with the reference to the attached drawings.

Figure 1:
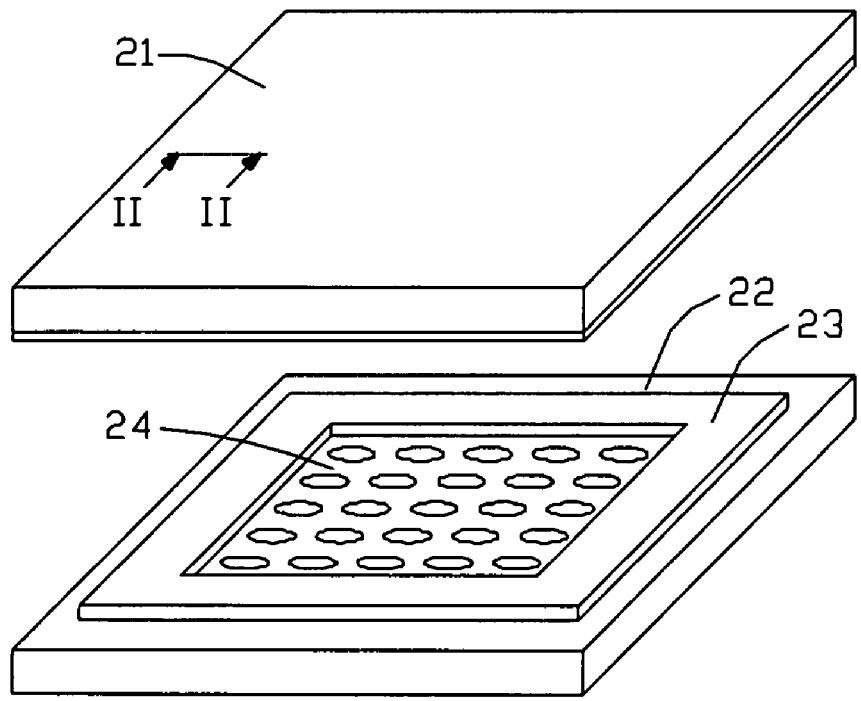
FIG. 1 is a schematic, exploded, isometric view of a liquid crystal panel of a first exemplary embodiment of the invention.

FIG. 1 shows a liquid crystal panel of a first exemplary embodiment of the present invention. The liquid crystal panel 2 includes a first substrate 21, a second substrate 22 opposite to the first substrate 21, and a sealant 23 disposed around a periphery of a main display region between the first substrate 21 and the second substrate 22. A liquid crystal layer 24 is provided in an intermediate region cooperatively defined by the first substrate 21, the second substrate 22, and the sealant 23. In this embodiment, the first substrate 21 is typically a color filter substrate, and the second substrate 22 is typically an array substrate.

Figure 2:
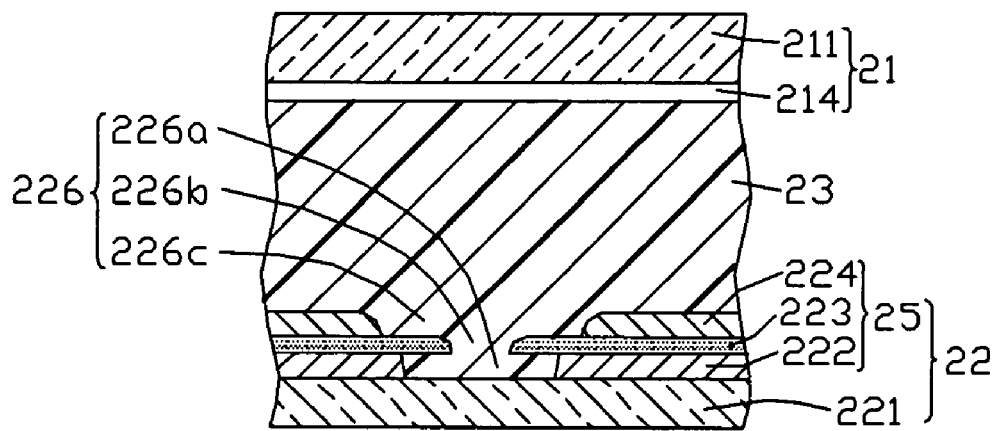
FIG. 2 is a cross-sectional view of part of the liquid crystal panel of the first embodiment once the liquid crystal panel is assembled, such part corresponding to line II-II of FIG. 1.

Referring also to FIG. 2, this is a cross-sectional view of part of the liquid crystal panel 2 once the liquid crystal panel 2 is assembled, such part corresponding to line II-II of FIG. 1. Aspects of a sealing structure of the liquid crystal panel 2 are shown in detail. The second substrate 22 includes a multi-layer structure 25 formed on a second base plate 221. The multi-layer structure 25 includes three layers, a first layer 222 formed on the second base plate 221, a second layer 223 formed on the first layer 222, and a third layer 224 formed on the second layer 223. A peripheral opening structure 226 is formed in the multi-layer structure 25. That is, the opening structure 226 is located at a peripheral region of an inner surface of the second substrate 22, with the multi-layer structure 25 defining the opening structure 226 therein and providing a sealing structure of the liquid crystal panel 2.

In a preferred embodiment, the opening structure 226 includes a first opening 226a within the first layer 222, a second opening 226b of the second layer 223 aligned wit the first opening 226a, and a third opening 226c within the third layer 224 aligned with the first opening 226a and the second opening 226b. As shown in FIG. 2, the first opening 226a is wider than the second opening 226b, and the third opening 226c is wider than both the second opening 226b and the first opening 226a. In other words, a transverse cross-sectional area of the second opening 226b is smaller than a transverse cross-sectional area of the first opening 226a, and smaller than a transverse cross-sectional area of the third opening 226c. In another aspect, an H-shaped profile of the multi-layer structure 25 is formed by the openings 226a, 226b, and 226c. With the orientation of the liquid crystal panel 2 as shown in FIG. 2, the H-shaped profile resembles the letter capital "H" rotated 90°. The sealant 23 is filled in the opening structure 226 of the multi-layer structure 25.

In a typical one-drop-fill process of assembly of the liquid crystal panel 2, the sealant 23 is applied on the periphery of the second substrate 22. Liquid crystal is dropped onto the second substrate 22 in the intermediate region. The first and second substrates 21, 22 are aligned with each other, and attached together by means of the sealant 23. The sealant 23 is then cured by UV irradiation or heating, whereby the first and second substrates 21, 22 are firmly adhered together.

In a typical vacuum-fill process of assembly of the liquid crystal panel 2, the sealant 23 is applied on the periphery of the second substrate 22. The first and second substrates 21, 22 are aligned with each other, and attached together by means of the sealant 23. The sealant 23 is then cured by UV irradiation or heating, whereby the first and second substrates 21, 22 are firmly adhered together. Then the intermediate region is evacuated, and liquid crystal is filled in the intermediate region via a hole in the sealant 23 under vacuum conditions.

An example according to the above-mentioned structure is as follows. The first substrate 21 is a color filter substrate, which includes a first base plate 211 and a transparent electrode 214 formed on the surface of the first base plate 211. For instance, the first base plate 211 can be a glass substrate, and the transparent electrode 214 can be formed by an indium tin oxide (ITO) layer. Furthermore, a black matrix layer and color filter layers (not shown) may be extended to the periphery of the first substrate 21 and disposed between the transparent electrode 214 and first base plate 211.

The second substrate 22 is an array substrate, which includes the second base plate 221, and the multi-layer structure 25 having the first layer 222, the second layer 223, and the third layer 224 formed sequentially on the second base plate 221. When the first layer 222 is a gate insulating layer (such as a nitride film or an oxide film), the second layer 223 is a semiconductor layer (such as non-crystalline silicon film) and the third layer 224 is a passivation layer (such as a nitride film or an oxide film), then the first opening 226a of the gate insulating layer, the second opening 226b of the semiconductor layer, and the third opening 226c of the passivation layer are combined to form the opening structure 226. The middle opening (the second opening 226b) has the smallest cross sectional area of all the openings 226a, 226b, 226c.

In the preferred embodiment of the present invention, the gate insulating layer is selected from a nitride film, an oxide film, and a stacked layer. The semiconductor layer is preferably a non-crystalline silicon film. Further, the second layer 223 can be a conductive layer made of metal or indium tin oxide (ITO).

Furthermore, the multi-layer structure can combine at least two layers with different sizes of openings. In the case where there are just two layers, a lower opening of a lower layer has a larger width than an upper opening of an upper layer formed on the lower layer. In such case, the sealant has an inverted T-shaped structure. In other words, the sealant with an H-shaped structure or an inverted T-shaped structure is formed according to the profile of the multi-layer structure and the opening structure.

In an alternative embodiment, the first substrate 21 can be an array substrate, and the second substrate 22 can be a color filter substrate.

The opening structure 226 of the sealing structure of the described embodiment efficiently enhances the strength of the adhesion between the first substrate 21 and the second substrate 22. This can be achieved by applying a slight change in mask design with respect to the second layer 223 in a process of manufacturing the second substrate 22. The detailed process steps are as follows:

Firstly, the first layer 222 is formed on the second base plate 221, and then the second layer 223 is formed on the first layer 222. A specific mask with slight changes is applied in order to keep the second layer 223 in the desired region of the sealant 23. By adopting one photolithography process, the second layer 223 is etched to form a predetermined pattern including the second opening 226b. In other words, the second layer 223 is also formed on the peripheral region of the second base plate 221. Then the third layer 224 is formed on the second layer 223. After other photolithography processes are applied, the third layer 224, the second layer 223 and the first layer 222 are selectively etched to pattern these layers 224, 223, 222. Then the first opening 226a is formed within the first layer 222, the second opening 226b is formed within the second layer 223, and the third opening 226c is formed within the third layer 224, wherein the first opening 226a, the second opening 226b, and the third opening 226c are aligned with each other. In the preferred embodiment, the etching selectivity of the first layer 222 and the second layer 223 is close to 1. That is, the etching rate of the first layer 222 is much faster than that of the second layer 223. Similarly, the etching selectivity of the second layer 223 and the third layer 224 is close to 1. That is, the etching rate of the third layer 224 is much faster than that of the second layer 223. Due to the differences between the etching rates of the first layer 222, the second layer 223 and the third layer 224, the second opening 226b is smaller than both the third opening 226c and the first opening 226a. In other words, an H-shaped profile of the multi-layer structure 25 is formed by the openings 226a, 226b and 226c. Thus, the sealing structure of the liquid crystal panel 2 is provided according to the opening structure 226 located at a peripheral region of an inner surface of the second substrate 22, with the multi-layer structure 25 defining the opening structure 226 therein. Then, the sealant 23 is filled in the opening structure 226 and forms the H-shaped structure. Subsequently, a plurality of spacers (not shown) is provided on one of the substrates 21, 22. Thereafter, the liquid crystal layer 24 with a plurality of liquid crystal molecules is formed on the inner surface of one of the first substrate 21 and the second substrate 22. Then the first substrate 21 and the second substrate 22 are aligned and assembled.

The etching method can be selected from the group consisting of wet etching and dry etching. Using a dry etching method such as sputter etching, ion beam etching, plasma etching or reactive ion etching (RIE) is preferred when the first layer 222 is a gate insulating layer, the second layer 223 is a semiconductor layer, and the third layer 224 is a passivation layer.

The etching rate of the passivation layer 224 is similar to that of the gate insulating layer 222, due to similar material compositions of the passivation layer 224 and the gate insulating layer 222.

In addition, a wet etching method with proper etching rate control of etching of the above-mentioned layers 224, 223, 222 is also applicable in the etching step of said other photolithographic processes.

In the case where the second layer 223 is a conductive layer, the second layer 223 can be the same layer as a source electrode and a drain electrode. When the second layer 223 is a conductive layer, the wet etching method is preferred.

Furthermore, an H-shaped profile or an inverted T-shaped profile of the multi-layer structure according to the invention also can be formed when the etching rate of one of the lower layers is larger than one of the etching rates of the upper layers. Thus, in one example, a lower opening of the lower layer is wider than an upper opening of the upper layer formed on the lower layer. In other words, the sealant with an H-shaped structure or an inverted T-shaped structure is formed according to the profile of the multi-layer structure and the opening structure.

Unlike in the prior art, the sealant 23 is filled in the opening structure 226 which is shaped as an H. That is, a portion of the sealant 23 is filled into the first opening 226a and is fixed by the H-shaped profile of the multi-layer structure 25. In other words, the improved sealing structure with the H-shaped opening structure 226 of the multi-layer structure 25 can prevent the sealant 23 separating from the second substrate 22. Further, the physical force of the sealant 23 achieved by the H-shaped profile of the opening structure 226 efficiently enhances adherence between the first substrate 21 and the second substrate 22. Thus, the sealing structure increases not only the contact area between the second substrate 22 and the sealant 23 but also the physical adhering force due to the H-shaped profile of the opening structure 226.

Figure 3:
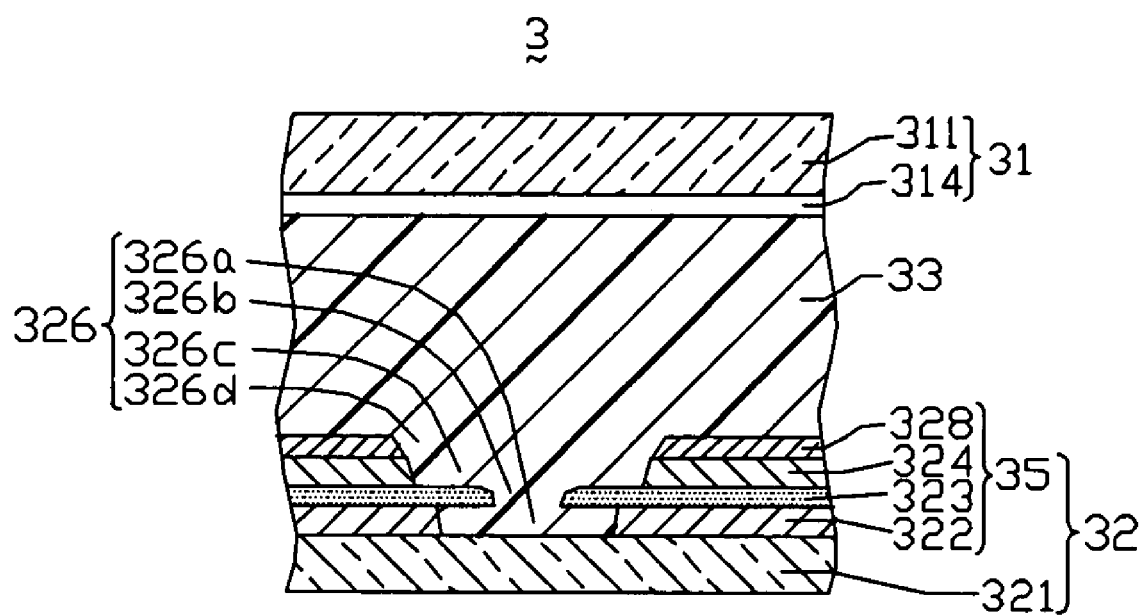
FIG. 3 is similar to FIG. 2, but showing a cross sectional view in the case of a liquid crystal panel of a second exemplary embodiment of the invention.
Figure 4:
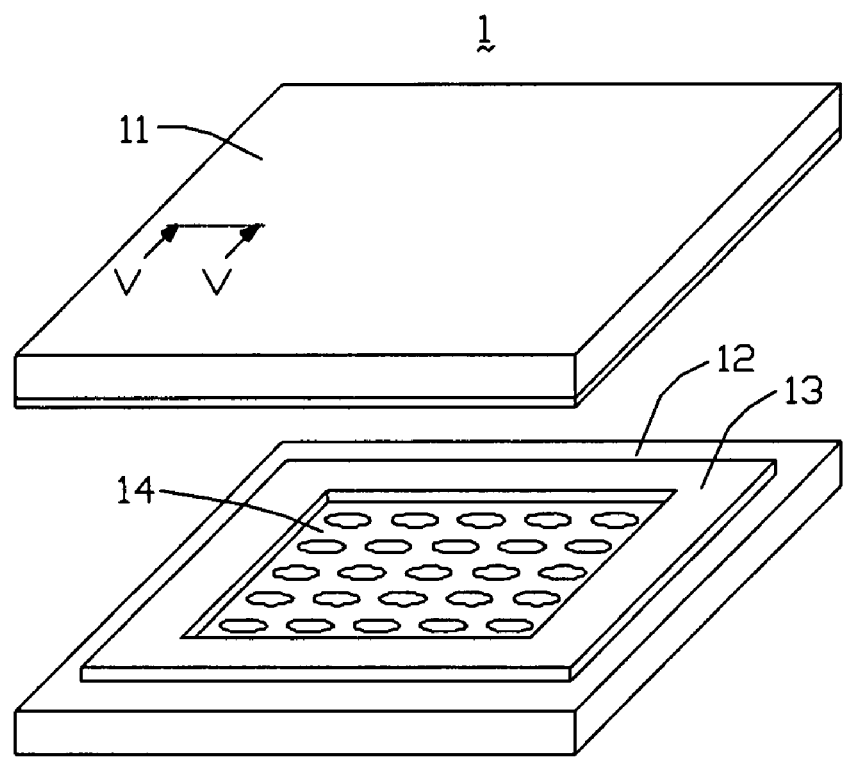
FIG. 4 is a schematic, exploded, isometric view of a conventional liquid crystal panel.
Figure 5:
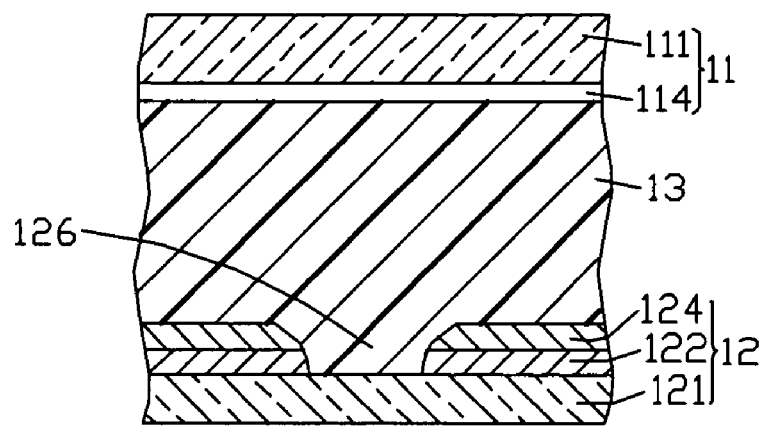
FIG. 5 is a cross-sectional view of part of the conventional liquid crystal panel once the liquid crystal panel is assembled, such part corresponding to line V-V of FIG. 4.

FIG. 3 shows a cross sectional view in the case of a liquid crystal panel of a second exemplary embodiment of the invention. The difference between the first embodiment and the second embodiment is the introduction of a fourth layer 328 for a multi-layer structure 35. The multi-layer structure 35 has at least four layers; that is, a first layer 322, a second layer 323, a third layer 324 and the fourth layer 328 disposed on a second base plate 321 sequentially. In the second embodiment, the fourth layer 328 is a planarization layer (such as an organic layer or a resin layer). Additionally, the opening structure 326 is located at a peripheral region of an inner surface of a second substrate 32, with the multi-layer structure 35 defining an opening structure 326 therein and providing a sealing structure of the liquid crystal panel 3. In this embodiment, the second substrate 32 is an array substrate. According to the embodiment, the opening structure 326 includes a first opening 326a of the first layer 322, a second opening 326b of the second layer 323 aligned with the first opening 326a third opening 326c of the third layer 324 aligned with the first opening 326a and the second opening 326b, and a fourth opening 326d of the fourth layer 328 aligned with the above-mentioned openings 326a, 326b, 326c. As shown in FIG. 3, the first opening 326a is wider than the second opening 326b, and each of the third opening 326c and the fourth opening 326d is wider than both the second opening 326b and the first opening 326a. In other words, a transverse cross-sectional area of the second opening 326b is smaller than all of a transverse cross-sectional area of the first opening 326a, a transverse cross-sectional area of the third opening 326c and a transverse cross-sectional area of the fourth opening 326d. In another aspect, an H-shaped profile of the multi-layer structure 35 is formed by the openings 326a, 326b, 326c and 326d. A sealant 33 is filled in the opening structure 326 of the multi-layer structure 35. In another aspect, an H-shaped profile of the multi-layer structure 35 is formed by the openings 326a, 326b, 326c and 326d. The sealant 33 is filled in the opening structure 326 of the multi-layer structure 35.

The opening structure 326 of the sealing structure of the described embodiment efficiently enhances the strength of the adhesion between a first substrate 31 and the second substrate 32. This can be achieved by applying a slight change in mask design with respect to the second layer 323 in a process of manufacturing the second substrate 32. The detailed process steps are as follows:

Firstly, the first layer 322 is formed on the second base plate 321, and then the second layer 323 is formed on the first layer 322. A specific mask with slight changes is applied in order to keep the second layer 323 in the desired region of the sealant 33. A predetermined pattern including the second opening 326b is formed by etching the second layer 323 in one photolithographic process. In other words, the second layer 323 is also formed on a peripheral region of the second base plate 321. Then the third layer 324 and the fourth layer 328 are formed sequentially an the second layer 323. After other photolithography processes, the fourth layer 328, the third layer 324, the second layer 323 and the first layer 322 are selectively etched and patterned to form the first opening 326a within the first layer 322, the second opening 326b within the second layer 323, the third opening 326c within the third layer 324, and the fourth opening 326d within the fourth layer 328. In the preferred embodiment, an etching selectivity of the first layer 322 and the second layer 323 is close to 1. That is, the etching rate of the first layer 322 is much faster than that of the second layer 323. Due to the differences between the etching rates of the first layer 322, the second layer 323, the third layer 324 and the fourth layer 328, the second opening 326b is smaller than all of the first opening 326a, the third opening 326c and the fourth opening 326d. In other words, an H-shaped profile of the multi-layer structure 35 is formed by the openings 326a, 326b, 326c and 326d. Thus, the sealing structure of the liquid crystal panel 3 is provided according to the opening structure 326 located at a peripheral region of an inner surface of the second substrate 32, with the multi-layer structure 35 defining the opening structure 326 therein. In other words, the etching rate of one of the lower layers is larger than that of the upper layers.

Furthermore, the multi-layer structure 35 having the foregoing layers, such as the first layer 322, the second layer 323, the third layer 324, and the fourth layer 328, and the opening structure 326 having the first opening 326a, the second opening 326b, the third opening 326c, and the fourth opening 326d, are combined to form an H-shaped profile of the multi-layer structure 35. Thus, an improved sealing structure achieved by the opening structure 326 of the multi-layer structure 35 is completed. Then, the sealant 33 is filled in the opening structure 326 and forms an H structure corresponding to the profile of the multi-layer structure 35. Thereafter, a liquid crystal layer with a plurality of liquid crystal molecules is formed on the inner surface of one of the first substrate 31 and the second substrate 32. Then, the first substrate 31 and the second substrate 32 are aligned and assembled.

Thus, the sealant 33 is sandwiched between the pair of substrates 31, 22 including in the opening structure 326 of the multi-layer structure 35.

Because the second substrate 32 is an array substrate, the first substrate 31 is a color filter substrate having a first base plate 311 and a transparent electrode 314 formed on the surface of the first base plate 311. The first base plate 311 can be a glass substrate, and the transparent electrode 314 can be formed by an indium tin oxide (ITO) layer.

The fourth layer 328 is a planarization layer, such as a resin layer or an organic layer. The fourth layer 328 also can be formed and patterned after other parts of the opening structure 326 of the multi-layer structure 35 have already been formed.

The etching rates of the fourth layer 328 and the third layer 324 are both larger than that of the second layer 323. In other words, the etching selectivity of the first layer 322, the third layer 324 and the fourth layer 328 is preferred to be close to zero.

In addition, the second layer 323 can be a semiconductor layer, having the same materials as an active layer of the second substrate 32. When the second layer 323 is a semiconductor layer, the dry etching described above is preferred.

In addition, the second layer 323 can be a conductive layer, which is the same layer as a source electrode and a drain electrode. When the second layer 323 is a conductive layer, wet etching described above is preferred.

While the above description has been by way of examples and in terms of preferred embodiments, it is to be understood that the invention is not limited thereto. To the contrary, the above description is intended to cover various modifications and similar arrangements, including as would be apparent to those skilled in the art. Therefore, the scope of the appended claims should be accorded the broadest interpretation so as to encompass all such modifications and similar arrangements.

What is claimed is:

1. A sealing structure of a liquid crystal panel having a pair of substrates and a liquid crystal layer disposed between the substrates, the sealing structure comprising:
    a multi-layer structure comprising a first layer formed above a first one of the substrates and a second layer formed above the first layer; and
    an opening structure formed at the multi-layer structure, the opening structure comprising a first opening in the first layer and a second opening in the second layer;
    wherein the first opening and the second opening are aligned with each other, the first opening is larger than the second opening, the first opening and the second opening cooperatively define an inverted T shape, and a sealant is sandwiched between the substrates, completely filling the opening structure.

2. The sealing structure of the liquid crystal panel as claimed in claim 1, wherein the etching selectivity of the first layer and the second layer is close to 1.

3. The sealing structure of the liquid crystal panel as claimed in claim 1, wherein the first layer is a gate insulating layer.

4. The sealing structure of the liquid crystal panel as claimed in claim 3, wherein the second layer is a semiconductor layer.

5. The sealing structure of the liquid crystal panel as claimed in claim 3, wherein the second layer is a conductive layer.

6. The sealing structure of the liquid crystal panel as claimed in claim 1, wherein the multi-layer structure further comprises a third layer formed above the second layer, and the opening structure further comprises a third opening in the third layer.

7. The sealing structure of the liquid crystal panel as claimed in claim 6, wherein the third layer is a passivation layer.

8. The sealing structure of the liquid crystal panel as claimed in claim 6, wherein the multi-layer structure further comprises a fourth layer formed above the third layer and the opening structure further comprises a fourth opening in the fourth layer.

9. The sealing structure of the liquid crystal panel as claimed in claim 8, wherein the fourth layer is a planarization layer.

10. A method of forming a sealing structure of a liquid crystal panel, the method comprising:
    forming a first layer at an inner surface of a substrate;
    forming a second layer above the first layer;
    forming a second opening in the second layer and a first opening in the first layer, wherein the first opening and the second opening are aligned with each other, the first opening is larger than the second opening, a portion of the substrate below the first opening is exposed, and the first opening and the second opening cooperatively define an inverted T shape; and
    filling a sealant in the first opening and the second opening such that the first and second openings are completely filled with the sealant.

11. The method in accordance with claim 10, further comprising forming a third layer above the second layer and a third opening in the third layer; wherein the third opening is aligned with the first opening, and the sealant is also completely filled in the third opening.

12. The method in accordance with claim 11, further comprising patterning the second layer to form the second opening in the second layer before forming the third layer above the second layer.

13. The method in accordance with claim 12, wherein the first layer is an insulator layer, the second layer is selected from the group consisting of a semiconductor layer and a conductive layer; and the third layer is a passivation layer.

14. The method in accordance with claim 11, further comprising forming a fourth layer above the third layer and patterning the fourth layer to form a fourth opening in the fourth layer.

15. The method in accordance with claim 14, wherein the fourth opening is aligned with the first opening, and the sealant is also completely filled in the fourth opening.

16. The method in accordance with claim 14, wherein the fourth layer is a planarization layer.

17. The method in accordance with claim 10, wherein forming the second opening in the second layer and the first opening in the first layer comprises selectively etching the second layer and the first layer.

18. The method in accordance with claim 11, wherein the first opening, the second opening, and the third opening cooperatively define an H-shaped profile.

19. The sealing structure of the liquid crystal panel as claimed in claim 6, wherein the first opening, the second opening and the third opening cooperatively define an H-shaped profile.

20. A sealing structure of a liquid crystal panel having a pair of substrates and a liquid crystal layer disposed between the substrates, the sealing structure comprising:

a gate insulating layer formed above one of the substrates;
a second layer formed above the gate insulating layer, the second layer being one of a semiconductor layer and a conductive layer;
a first opening in the gate insulating layer; and
a second opening in the second layer;
wherein the first opening and the second opening are aligned with each other, the first opening is larger than the second opening, and a sealant is sandwiched between the substrates, completely filling the first and the second openings.

* * * * *